Patented Aug. 15, 1950

2,518,525

UNITED STATES PATENT OFFICE 2,518,525

LEVULINIC ACID SALTS OF AMINO BENZOATES

David Curtis, New York, N. Y.

No Drawing. Application August 12, 1946,
Serial No. 690,073

7 Claims. (Cl. 260—501)

The present invention relates to new anesthetic substances, more particularly to levulinic acid salts of alkyl esters of amino aromatic acids, and more particularly to levulinic acid salts of alkyl para-amino benzoic acid, and to solvents for such salts.

It is the object of the present invention to provide a new and useful group of anesthetic compounds suitable for anesthetic uses.

It is another object of the present invention to provide a group of anesthetic substances soluble in suitable solvents, such substances combining with their anesthetic properties the antiseptic effects of levulinic acid.

It is a further object of the present invention to provide simple methods of forming the new anesthetic compounds of the present invention.

I have found that linking levulinic acid ($CH_3.CO.CH_2.CH_2.COOH$) to an alkyl ester of para-amino-benzoic acid forms an anesthetic substance which is soluble in numerous solvents, and in some cases the new salt possesses a greater solubility in certain solvents than the corresponding base has in the same solvent.

The relative non-toxicity of levulinic acid makes it a desirable acid with which to combine the anesthetic substances of the alkyl amino aromatic group.

R. G. Tischek et al. J. Amer. Pharm. Assoc., 31, 217-20 (1942) states that the administration of 3 cc. of levulinic acid to man for 30 days showed no significant changes in his general well being. Laboratory tests on albino rats, guinea pigs and chicks showed levulinic acid to be non-toxic to the animals when fed to the extent of 5% content in their food. They conclude that levulinic acid may be used in small quantities to acidulate foods and beverages.

The administration of the calcium salt of levulinic acid is well known for its beneficial results.

L. Bracalini, Boll. chim. farm. 78, 457-9 (1939). Calcium levulinate solution is suitable for hypodermic and intravenous injections. Sterilization of the ampules in neutral glass caused no perceptible change in the quality of the solution, and the solution produced no local or general reactions on intravenous injection in man and in animals.

B. Gordon et al. in J. Lab. Clin. Med. 18, 509-11 (1933) states intravenous injections of 1-10 cc. volumes of calcium levulinate in concentration of 3-14% caused an increase in the calcium content of the blood in tubercular patients. A considerable reduction in oedema was also observed in a number of instances.

The sterilizing action of levulinic acid is referred to by S. T. in J. Agr. Chem. Soc. of Japan 13, 458-66 (1937). The sterilizing action of ketonic acids (such as levulinic acid, for instance) appears to be stronger than those of other monobasic fat acids having an equal number of carbon atoms.

The alkyl esters of para-amino-benzoic acid that may be used to form salts with levulinic acid include the following: Ethyl-para-amino-benzoate (benzocaine); propyl-para-amino-benzoate; iso-butyl-para-amino-benzoate; normal-butyl-para-amino-benzoate; and methyl-meta-amino-p-hydroxy-benzoate (orthoform).

The levulinates of the alkyl-para-amino-benzoates have the possible structural formula—

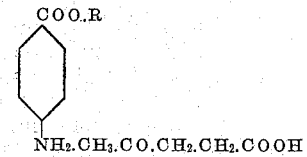

Where R stands for an alkyl group.

In the case of orthoform levulinate, the amino group is in the meta position and the hydroxyl group is in the para position on the benzene ring; its possible structural formula is:

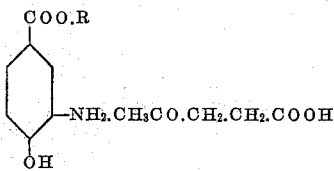

where R stands for $CH_3$.

The anesthetic salts of the present invention may readily be prepared by heating the anesthetic base and the levulinic acid in equimolecular weights in a suitable vessel on the water bath. The mixture is stirred and heated until complete liquefaction and melting takes place and the reaction is carried out to completion.

The formation of the salts of the present invention may also take place by dissolving substantially equimolar weights of the anesthetic base and levulinic acid in a suitable solvent, and may be left in that solvent, making the preparation a solution of the salt ready for use.

If the anesthetic base and levulinic acid are dissolved in a volatile vehicle, such as acetone, for instance, the solution may be heated for a while to complete the reaction, and the salt may then be crystallized from its solution by removing the volatile vehicle.

Levulinic acid salts of the alkyl-para-aminobenzoates may also be prepared by double decomposition of a salt of the anesthetic base acted upon by a suitable salt of a levulinic acid in a suitable solvent. Ionic transposition takes place, resulting in the formation of the anesthetic levulinate.

The salts of the present invention crystallize easily by any of the above methods, the crystals of the alkyl-amino-benzoate salts of levulinic acid being generally of fine needle like appearance, the crystals arranging themselves in clusters, star formation, etc. Orthoform Levulinate crystallizes in fine small crystals.

The salts of the present invention melt at relatively low temperatures, and are characterized by being soluble in many solvents, some of a volatile nature, some volatile with steam, and some non-volatile solvents.

Thus, the salts of the present invention may be formed and dissolved in alcohol, acetone, ether, chloroform, as examples of volatile solvents; as examples of essential oils, in which the salts of the present invention may be formulated and dissolved in, the following may be listed:

Oil of cloves, eugenol, iso-eugenol, eugenol methyl ether, iso-eugenol methyl ether, methyl salicylate, propyl salicylate, ethyl salicylate, ethyl levulinate, anethole, oil of anise, ethyl cinnamate, oil of citronella, and others.

As an illustration of the generally regarded as non-volatile liquids in which the salts of the present invention may be formed and dissolved in, the following may be listed:

Diethylene glycol, glycol, mono-ethyl ether of diethylene glycol (carbitol), propylene glycol, and other derivatives of glycol; ethyl and methyl ethers of glycerine, and other ethers of glycerine; the salts of the present invention are also soluble in hot glycerine, and may remain in solution for prolonged periods of time by the addition to the glycerine of various alcohols including benzyl alcohol, miscible with the glycerine. Solution of the salts of the present invention may also be formed in a 50% solution of glucose, the solution remaining fluid long enough to be used clinically. The products formed upon solidification may likewise be used as ointments.

Example No. 1.—As specific examples of the formation of the compounds of levulinic acid with alkyl-amino-benzoates, the ethyl-p-amino-benzoyl-levulinate may be prepared by dissolving 2.475 gms. of benzocaine and 1.74 gms. of levulinic acid in about 30 cc. of acetone and heating the solution on the water bath in a glass container for a few minutes to complete the reaction. The salt is then crystallized by removing the solvent on volatilizing same, and drying the crystals. Needle like crystals are thus obtained.

Similarly, other alkyl-para-amino-benzoyl-levulinates may be prepared, using equimolar proportions of the anesthetic base and levulinic acid, dissolving the reactants in a suitable volatile vehicle, warming to effect combination and the formation of the compound, and crystallizing the same by removing the volatile vehicle and drying the formed compound.

As an example of the formation of the salts of the present invention by direct union of the ingredients without the use of a solvent, or dispersing medium, the following may be given:

Example No. 2.—8.25 gms. of benzocaine may be mixed with 5.8 gms. of levulinic acid in a 100 cc. beaker, placed on the water bath and stirred and heated until complete fusion and liquefaction take place and the reaction is completed. Upon cooling, fine needle like crystals are obtained.

Similarly, the salts of levulinic acid with propyl-p-amino-benzoate, iso-butyl-p-amino-benzoate, n-butyl-p-amino-benzoate, and orthoform, may be obtained by fusing and melting the respective anesthetic ester with the acid in equimolar proportions.

When it is desired to obtain a solution of any of the levulinates of the present invention in any of the above listed solvents, or in similar solvents, such a solution may be formed by the direct combination in suitable proportions or quantities of the reactant components of that particular levulinate in that particular solvent, or a mixture of solvents, the reaction being facilitated and accomplished by the application of heat. Such a solution may contain, if desired, an excess of the molecular equivalent of one component over the other.

The reactants may be prepared in powder, or semi-pasty form, the mixtures containing predetermined quantities of the levulinic acid and the anesthetic base, as well as any other solid substances that may be desired to incorporate into the final solution.

As specific examples of the preparation of the compounds of the present invention in solutions, the following may be given:

Example No. 3.—2.5 gms. of benzocaine and 1.74 gms. of levulinic acid are warmed in a beaker on the water bath in the presence of enough methyl salicylate to make a total final volume of 10 cc. This represents a substantially 25% solution of the benzocaine component on a weight to volume basis.

A similar solution made up, using 2.5 gms. of benzocaine dissolved in 7.5 cc. of methyl salicylate, also making a total volume of 10 cc., soon causes a precipitation of benzocaine, proving that the benzocaine levulinate is of considerable greater solubility in methyl salicylate than benzocaine alone.

Similarly, benzocaine levulinate proved of greater solubility in ethyl cinnamate than benzocaine base alone in the same solvent.

Example No. 4.—3.8 cc. of iso-eugenol are mixed with 3.04 cc. of levulinic acid (3.48 gms.) and warmed in a glass beaker over a low flame hot plate and 5.0 gms. of benzocaine are stirred in. The mixture is warmed until solution of the benzocaine takes place, 2.5 cc. of methyl salicylate and 2.5 cc. of oil of cassia are added. Instead of iso-eugenol, eugenol may be used, or oil of cloves. A potent anesthetic for dental use is thus obtained. The solution may be diluted with a mixture of equal volumes of eugenol, methyl salicylate and oil of cassia to make the benzocaine content of the solution of 5-10% concentration on a weight to volume basis. Such a solution is also highly potent for dental use as a topical anesthetic.

Example No. 5.—3.48 gms. of levulinic acid are mixed with 25 cc. of eugenol, and 5 gms. of benzocaine, substantially the equimolar proportion to the amount of levulinic acid present, are stirred in, and warmed until solution takes place. A potent anesthetic for dental use is obtained for surface application.

The amount of the eugenol can be reduced to 10 cc. in the above mixture to obtain a solution of the anesthetic levulinate.

The proportions of the benzocaine and levulinic acid that may be dissolved in the presence of each other in eugenol, oil of cloves, iso-eugenol, their ethers, and other essential oils and mixtures of these vehicles with each other lend themselves to numerous variations. Such solutions may be made up either for direct use, or for stock purposes to be diluted with similar, or other essential oils as needed.

The benzocaine levulinate and other levulinates of the present invention that may be dissolved in the above listed group of essential oils may be at least of a 25% concentration of the benzocaine base on a weight to volume basis. Since a solution containing benzocaine of 5–10% concentration, or even less, suffices for ordinary use, it is obvious that the solubility of the anesthetic levulinates of the present invention in essential oils, as well as in other solvents, is quite extensive.

As specific examples of the formation and solution of the alkyl-amino-benzoate compounds with levulinic acid in non-volatile vehicles, the following may be cited:

*Example No. 6.*—The respective quantities of 5.0 gms. of benzocaine; 5.4 gms. of propyl-p-amino-benzoate; 5.8 gms. of iso-butyl-p-amino-benzoate; 5.8 gms. of N-butyl-p-amino-benzoate were each dissolved in the presence of their respective chemical equivalent amount of levulinic acid, 3.48 gms., in 30 cc. of propylene glycol by heating in a glass beaker over a low flame hot plate until solution took place. When cool, the solution was made up to a final volume of 50 cc. with propylene glycol, representing substantially a 10% concentration of the anesthetic base on a weight to volume basis.

*Example No. 7.*—3 gms. of benzocaine may be similarly dissolved in propylene glycol in the presence of 2.05 gms. of levulinic acid in a total volume of 20 cc. of propylene glycol. A stable 15% solution of benzocaine base is thus obtained on a weight to volume basis; and a 25% solution of benzocaine levulinate and propylene glycol on a weight to volume basis.

A solution of 3 gms. of benzocaine base in a total volume of 20 cc. of propylene glycol soon begins to show precipitation of benzocaine. Benzocaine levulinate therefore forms a more stable solution in propylene glycol than does benzocaine base alone.

*Example No. 8.*—2.505 gms. of orthoform may be dissolved in the presence of 1.52 gms. of levulinic acid in a total volume of 25 cc. of propylene glycol.

*Example No. 9.*—2.5 gms. of benzocaine may be dissolved in the presence of 1.74 gms. of levulinic acid in ethyl glycerine by warming on the water bath in a glass beaker; the total volume may then be made up to 10 cc. with ethyl glycerine.

*Example No. 10.*—20 gms. of dextrose may be dissolved in 20 cc. of water, on heating the beaker on the hot plate for a few minutes. 2.5 gms. of benzocaine and 1.74 gms. of levulinic acid may be stirred in and heated for a few minutes when a clear solution is obtained. The solution is acid to litmus paper and is anesthetic. Benzocaine alone heated under similar conditions in a solution of the same concentration of dextrose in water appeared to be floating on the surface of the solution in a molten state but did not dissolve; the addition of the levulinic acid caused the benzocaine to dissolve rapidly.

Similarly, I made up the respective levulinate solutions of propyl-p-amino-benzoate, iso-butyl-p-amino-benzoate, N-butyl-p-amino-benzoate in a 50% solution of dextrose in water. The iso-butyl-p-amino-benzoate-levulinate remained liquid longer than the other salts, and solidified to a transparent soap like mass. The other alkyl-amino-benzoate-levulinates upon solidification formed opaque soap like masses.

As a specific example of the formation of an alkyl-amino-benzoate-levulinate by double decomposition the following may be cited:

*Example No. 11.*—4.95 gms. of benzocaine are dissolved in about 75 cc. of acetone, and 2.474 cc. of conc. HCl, containing substantially the equivalent amount of the acid requisite to form benzocaine hydrochloride, are added. A white insoluble precipitate of benzocaine hydrochloride forms at once. Separately, 1.2 gms. of sodium hydroxide and 3.48 gms. of levulinic acid are dissolved in a small volume of water with the formation of sodium levulinate. This solution is added to the benzocaine hydrochloride in the acetone and the mixture is stirred for a while, when gradually sodium chloride is formed, practically insoluble in the solvent mixture, and it collects at the bottom of the beaker. The sodium chloride may be filtered off, leaving the formed benzocaine levulinate in solution. The needle like crystals of benzocaine levulinate may be isolated from the liquid in the usual way. Benzocaine oxalate and calcium levulinate may similarly interact.

It may here be noted that in all cases where it is desired to form a solution of an anesthetic levulinate of the present invention in a suitable solvent ready for use, the anesthetic base and the levulinic acid in substantially equimolar quantities, or in other suitable proportions, may first be fused and liquefied prior to dissolving the product in the particular solvent. The levulinic acid may first be dissolved in the solvent and the requisite amount of the anesthetic base may then be stirred in, the solution may then be suitably heated to form the soluble compound.

The extensive solubility of calcium levulinate in water, which solution may also contain an epinephrine salt dissolved therein, and the fact that a solution of the anesthetic levulinates of the present invention in propylene glycol is miscible to a certain extent with water permits the formation of an anesthetic preparation which also possesses augmented haemostatic properties, owing to the presence of the calcium ion.

It is known that recalcified citrated blood plasma clots more quickly and firmly than does untreated plasma. U. Ebbecker, in Arch. Gez. Phys. Fflugers, v. 243, pp. 43–53 (1939). As a specific example of preparing this type of an anestehtic-haemostatic fluid, the following may be given:

*Example No. 12.*—0.065 gm. of epinephrine base may be dissolved in about 20 cc. of water, acidulated slightly with a few drops of levulinic acid, resulting in the formation of epinephrine levulinate. 5 gms. of calcium levulinate are then dissolved in the same solution; a suitable anti-oxidant may be incorporated in the solution. As an example, such an anti-oxidant may be sodium hydrosulphite, potassium metabisulphite, sodium bisulphite, acetone sodium bisulphite, or mixtures of these with each other, or with sodium thiosulphate. Separately, 1.74 gms. of levulinic acid and 2.5 gms. of benzocaine are dissolved in 25 cc. of propylene glycol, stirring and warming to facilitate the formation of the benzocaine levulinate. Both solutions are mixed and made up to 65 cc. volume with additional propylene glycol. This represents a 1:1000 epinephrine concentration, weight to volume, and the haemostatic qualities of the preparation are enhanced by the presence of the calcium levulinate. Other suitable salts of epinephrine may be used in the above solution.

While the alkyl esters of the para-amino-benzoic acid have been listed as suitable anesthetic bases capable of forming salts with levulinic acid, the alkyl esters of amino-benzoic acid, other than the para form, are also contemplated in this invention; and alkyl esters of amino-aromatic acids in general may be included as suitable anesthetic bases capable of combining with levulinic acid to form compounds as described in the present invention.

A new and useful type of anesthetic salts of levulinic acid and alkyl-amino-aromatic acid esters have been produced. These salts are characterized by ease of formation and ready solubility in numerous important solvents, producing preparations ready for immediate use, as well as stock solutions for suitable dilution purposes prior to use.

The levulinic acid in addition to being practically non-toxic, and having some antiseptic value, confers upon the formed salts extensive solubility properties in many useful solvents. I attribute the solubilizing effect in many solvents that the levulinic acid exerts upon the anesthetic it is linked with to its ketonic nature, as well as to the presence of the non-polar $CH_2$ groupings in its molecular structure.

The above information is descriptive of the new anesthetic substances of the present invention and of preferred embodiments of the same in solution form. Preferred methods of the preparation of the said substances and of their solutions have also been described. It is however obvious that many variations may be made in the solutions or in the methods of preparation of the substances and their solutions in various solvents without the use of the inventive faculties and within the spirit and scope of the claims hereto appended.

What I claim is:

1. As a new composition of matter, a salt of an alkyl ester of an amino-benzoic acid, in which the alkyl radicle is a member of the group consisting of methyl, ethyl, propyl and butyl radicles, and levulinic acid.

2. As a new composition of matter, a salt of an alkyl ester of para-amino-benzoic acid, in which the alkyl radicle is a member of the group consisting of methyl, ethyl, propyl and butyl radicles, and levulinic acid.

3. As a new composition of matter, the compound of ethyl para-amino-benzoate in combination with levulinic acid.

4. As a new composition of matter, the compound of butyl para-amino-benzoate in combination with levulinic acid.

5. As a new composition of matter, the compound of methyl meta-amino-para-hydroxy-benzoate in combination with levulinic acid.

6. The method of preparing the compound described in claim 1, which comprises the steps of mixing the anesthetic ester with levulinic acid in substantially equimolecular proportions, and heating the mixture until complete liquefaction and union takes place.

7. The method of preparing a solution of ethyl para-amino benzoate in combination with levulinic acid, which comprises the steps of adding the anesthetic ester and levulinic acid in substantially equimolecular proportions to a solvent comprising eugenol, and heating the mixture to effect solution of the reactants.

DAVID CURTIS.

REFERENCES CITED

The following references are of record in the file of this patent:

UNITED STATES PATENTS

| Number | Name | Date |
|---|---|---|
| 2,045,125 | Curtis | June 23, 1936 |
| 2,267,739 | Kemppe | Dec. 30, 1941 |
| 2,268,915 | Wastl et al. | Jan. 6, 1942 |
| 2,382,546 | Curtis | Aug. 14, 1945 |
| 2,395,538 | Curtis | Feb. 26, 1946 |

OTHER REFERENCES

U. S. Dispensatory, 23d ed. (1943), page 687.